United States Patent
Sugizaki et al.

(10) Patent No.: US 7,574,088 B2
(45) Date of Patent: Aug. 11, 2009

(54) OPTICAL FIBER AND OPTICAL FIBER RIBBON, AND OPTICAL INTERCONNECTION SYSTEM

(75) Inventors: Ryuichi Sugizaki, Tokyo (JP); Iwao Shimotakahara, Tokyo (JP); Harumi Inaba, Tokyo (JP); Takeshi Yagi, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 12/124,598

(22) Filed: May 21, 2008

(65) Prior Publication Data
US 2008/0226241 A1   Sep. 18, 2008

Related U.S. Application Data

(63) Continuation of application No. PCT/JP2007/067055, filed on Aug. 31, 2007.

(30) Foreign Application Priority Data
Aug. 31, 2006 (JP) ............................ 2006-236204

(51) Int. Cl.
*G02B 6/02* (2006.01)
*G02B 6/22* (2006.01)
*G02B 6/00* (2006.01)

(52) U.S. Cl. .................. 385/126; 385/100; 385/114; 385/123; 385/127; 385/128; 385/141; 385/144

(58) Field of Classification Search .............. 385/126
See application file for complete search history.

(56) References Cited

U.S. PATENT DOCUMENTS

| | | | |
|---|---|---|---|
| 7,046,885 B2 * | 5/2006 | Sugizaki et al. | 385/123 |
| 7,099,545 B2 * | 8/2006 | Sako et al. | 385/123 |
| 7,116,872 B2 * | 10/2006 | Okuno et al. | 385/114 |

(Continued)

FOREIGN PATENT DOCUMENTS

JP         01-295207 A        11/1989

(Continued)

OTHER PUBLICATIONS

Masataka Ikeda, et al., "Low Bending Loss Optical Fiber with Reduced Splice Loss", Institute of Electronics, Information and Communication Engineers, Technical Report of IEICE, OCS2003-43, OFT2003-25, Aug. 2003, pp. 35-40. (With English Abstract and partial computer generated translation).

(Continued)

*Primary Examiner*—Frank G Font
*Assistant Examiner*—Ryan Lepisto
(74) *Attorney, Agent, or Firm*—Oblon, Spivak, McClelland, Maier & Neustadt, P.C.

(57) ABSTRACT

An optical fiber, made of silica-based glass, comprising a core and a cladding. The optical fiber having a mode field diameter of 6.5 μm or larger at a wavelength of 1300 nm, transmitting light with a wavelength of 1250 nm in a single mode, and having a bending loss of 1 dB/turn or smaller at a wavelength of 1300 nm when the optical fiber is bent with a curvature radius of 1.5 mm.

12 Claims, 6 Drawing Sheets

U.S. PATENT DOCUMENTS

| | | | |
|---|---|---|---|
| 7,126,748 B2 * | 10/2006 | Sugizaki et al. | 359/334 |
| 7,295,741 B2 * | 11/2007 | Sako et al. | 385/127 |
| 7,366,386 B2 * | 4/2008 | Sako et al. | 385/123 |
| 7,440,167 B2 * | 10/2008 | Taniguchi et al. | 359/334 |
| 2006/0034575 A1 * | 2/2006 | Sako et al. | 385/127 |
| 2006/0093297 A1 * | 5/2006 | Sako et al. | 385/126 |
| 2006/0198589 A1 * | 9/2006 | Sako et al. | 385/123 |
| 2007/0041618 A1 | 2/2007 | Harrington et al. | |
| 2007/0147756 A1 | 6/2007 | Matsuo et al. | |
| 2008/0226241 A1 | 9/2008 | Sugizaki et al. | |

FOREIGN PATENT DOCUMENTS

| | | |
|---|---|---|
| JP | 01-300207 A | 12/1989 |
| JP | 2001-278641 A | 10/2001 |
| JP | 2006-126414 A | 5/2006 |
| WO | WO 2006/025231 A1 | 3/2006 |

OTHER PUBLICATIONS

U.S. Appl. No. 12/180,788, filed Jul. 28, 2008, Sugizaki, et al.

U.S. Appl. No. 12/192,169, filed Aug. 15, 2008, Sugizaki, et al.

* cited by examiner

FIG.5

| NUMBER | Δ1 [%] | α1 | Δ2 [%] | Δ3 [%] | a [μm] | b [μm] | c [μm] | MFD [μm] | BENDING LOSS [dB/TURN] | DISPERSION [ps/nm/km] | CUT-OFF FREQUENCY [nm] |
|---|---|---|---|---|---|---|---|---|---|---|---|
| A1 | 0.6 | step | -0.40 | - | 7.70 | 38.5 | - | 6.7 | 1.0 | 2.3 | 1245 |
| A2 | 0.7 | 4.0 | -0.05 | - | 7.80 | 46.8 | - | 6.6 | 1.0 | -3.4 | 1246 |
| A3 | 0.7 | 4.0 | -0.15 | - | 8.10 | 48.6 | - | 6.5 | 0.9 | -1.6 | 1237 |
| A4 | 0.8 | 1.5 | -0.40 | - | 9.90 | 50.0 | - | 6.5 | 1.0 | -4.2 | 1245 |
| A5 | 0.8 | 1.0 | -0.40 | - | 9.30 | 46.5 | - | 7.0 | 1.7 | 1.6 | 1231 |
| A6 | 0.9 | 1.5 | -0.40 | - | 10.00 | 50.0 | - | 6.2 | 0.8 | -3.5 | 1240 |
| A7 | 0.5 | step | -0.40 | - | 8.00 | 40.0 | - | 6.9 | 1.9 | 3.4 | 1240 |
| B | 0.7 | 3.0 | -0.40 | 0.2 | 5.00 | 7.0 | 7.7 | 6.5 | 0.9 | -7.2 | 1243 |
| C | 0.8 | 2.0 | 0.00 | -0.4 | 8.80 | 11.0 | 44.0 | 6.5 | 0.8 | -2.8 | 1245 |

OPTICAL FIBER AND OPTICAL FIBER RIBBON, AND OPTICAL INTERCONNECTION SYSTEM

CROSS-REFERENCE TO RELATED APPLICATIONS

This application is a continuation of PCT/JP2007/067055 filed on Aug. 31, 2007, the entire content of which are incorporated herein by reference.

BACKGROUND OF THE INVENTION

1. Field of the Invention

The present invention relates to an optical fiber typically used for optical wiring inside an apparatus.

2. Description of the Related Art

Schemes used for signal transmission inside an apparatus can be two types: electric transmission scheme and optical interconnection scheme. With the recent increase of the speed of CPU clock frequencies, occurrence of cross-talk, which is caused by high density wiring, is a problem for the electric transmission scheme. Therefore, application of a waveform shaping technique, etc., is necessary. As a result, when the electric scheme is employed as the signal transmission scheme in an apparatus, it is known that a transmission distance of about 1 m and a transmission speed of about 10 Gbps are the limits for the transmission.

On the other hand, the optical interconnection scheme enables execution of transmission over a much broader band compared to the electric transmission scheme and enables configuration of a signal transmission system that uses small-size low-power-consumption optical components. Therefore, the optical interconnection scheme is drawing attention as an in-apparatus signal transmission technique that is to replace the electric transmission scheme.

A scheme that employs an optical fiber is also drawing attention as one of optical transmission units employing the optical interconnection scheme. All the optical components used in an apparatus are desired to be able to be accommodated in a space as small as possible. Therefore, an optical fiber to be used for the optical interconnection scheme is desired to enable flexible wiring and to have a small connection loss between the optical fibers or between the optical fiber and a light source, etc.

On the other hand, as to the light source, Vertical-Cavity Surface-Emitting Laser, hereinafter, "VCSEL" that operates at the direct modulation from 2.5 Gbps to 10 Gbps is drawing attention as an access-based, an Ethernet (a registered trademark), and a fiber channel un-cooled light sources. VCSEL has the following features compared to an edge-emitting laser such as a distributed-feedback (DFB) laser.

(a) A laser light beam is output perpendicularly to the substrate surface.

(b) Can be easily configured as a multi-channel array.

(c) Can operate at a low threshold value and with small power consumption.

(d) The emitting surface has a high reflectivity and it is insensitive to the returned light (isolator-free).

(e) Shape of the emitted light beam is circular and the light beam has a high coupling factor with a fiber (lens-free).

Because the components such as an isolator and a lens can be omitted as explained above, the number of components can be reduced. In other words, the VCSEL is a device that can facilitate reduction of the cost as a module. A VCSEL for a 850-nm band of wavelength and using a GaAs/AlGaAs quantum, etc., as an active layer is already prevailing widely as a de facto standard of short-distance communication laser elements. A typical optical fiber used in this case can be a silica-based graded-index optical fiber that is a type of multi-mode fiber (hereinafter, "MMF").

An MMF is characterized in that it has a core diameter that is as large as that of a single-mode fiber (hereinafter, "SMF"), and a large numerical aperture. Therefore, high precision is not necessary for a connection between optical components such as between optical fibers or between an optical fiber and a light source, etc. Therefore, easy connection is enabled.

Recently, aiming at executing higher-speed communication, considering application of an SMF that has a smaller loss and a wider band compared to an MMF is started. The VCSEL that has an oscillation wavelength in a 1.3 μm band (1,300±50 nm) that is a small-loss band for silica-based optical fibers, is drawing attention as a light source used in this case, and research and development of the VCSEL are actively carried out.

However, a standard SMF provided in ITU-T (International Telecommunication Union Telecommunication Standard Sector) G.652 can not cope with the above communication because a large bending loss occurs when this SMF is accommodated in an apparatus.

As to an SMF having lesser bending loss, an optical fiber including a portion that has a lower refractive index than that of a cladding in the cladding portion of the standard SMF and, therefore, having a trench-shaped refractive index profile has been reported as an optical fiber preferably used for FTTH (Fiber To The Home) (for example, Non-Patent Document 1). However, this fiber is incomplete to be used in an optical interconnection system.

Non-Patent Document 1: Masataka Ikeda, Shoichiro Matsuo, and Kuniharu Himeno, "Low Bending Loss Optical Fiber with Reduced Splice Loss", Technical Report of Institute of Electronics, Information and Communication Engineers, OCS2003-43, OFT2003-25 (2003-8)

As above, as to an optical fiber to be used in an optical interconnection system, it is required to realize an optical fiber for which both of the bending loss thereof and the connection loss thereof are reduced, that enables high-speed optical transmission, and that is suitable for easily constructing the optical interconnection system.

A standard SMF can not cope with any optical interconnection system because a large amount of bending loss occurs to the SMF. Therefore, it is necessary to reduce the bending loss of an optical fiber. However, even SMFs for which the bending loss has been reduced and that are preferably used for FTTH, including the above optical fiber described in Non-Patent Document 1, are not suitable for use in an optical interconnection system.

SUMMARY OF THE INVENTION

It is an object of the present invention to at least partially solve the problems in the conventional technology.

According to an aspect of the present invention, there is provided an optical fiber that has a core and a cladding and that is made of silica-based glass, wherein the optical fiber having a mode field diameter of 6.5 μm or larger at a wavelength of 1300 nm, transmitting light with a wavelength of 1250 nm in a single mode, and having a bending loss of 1 dB/turn or smaller at a wavelength of 1300 nm when the optical fiber is bent with a curvature radius of 1.5 mm.

According to another aspect of the present invention, there is provided an optical fiber ribbon wherein the optical fiber ribbon is formed by placing a plurality of optical fibers in parallel to each other and integrating the optical fibers in the form of a flat belt, each of the optical fibers having a core and a cladding and that is made of silica-based glass, wherein the optical fiber having a mode field diameter of 6.5 μm or larger at a wavelength of 1300 nm, transmitting light with a wavelength of 1250 nm in a single mode, and having a bending loss of 1 dB/turn or smaller at a wavelength of 1300 nm when the optical fiber is bent with a curvature radius of 1.5 mm.

According to still another aspect of the present invention, there is provided an optical interconnection system for a communication wavelength of a 1.3 μm band, the optical interconnection system including an optical fiber that has a core and a cladding and the optical fiber being made of silica-based glass, wherein the optical fiber having a mode field diameter of 6.5 μm or larger at a wavelength of 1300 nm, transmitting light with a wavelength of 1250 nm in a single mode, and having a bending loss of 1 dB/turn or smaller at a wavelength of 1300 nm when the optical fiber is bent with a curvature radius of 1.5 mm, and the optical fiber transmits an optical signal; and a surface emitting laser that injects an optical signal in a wavelength of a 1.3 μm band into the optical fiber.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a chart of characteristics of the optical fibers having the refractive index profiles shown in FIGS. 4, 5, and 7 obtained when parameters thereof are set (the values respectively of MFD, the bending loss, and the dispersion are those at a wavelength of 1,300 nm.);

DETAILED DESCRIPTION OF THE PREFERRED EMBODIMENTS

Figure 1:
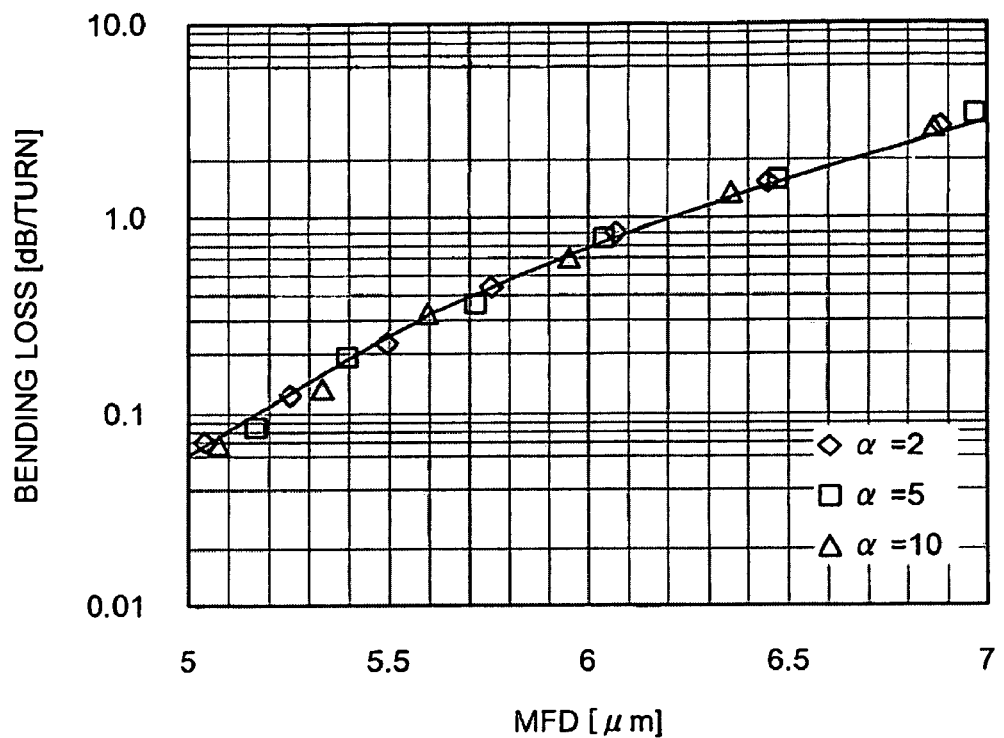
FIG. 1 is a graph of the relation between a bending loss and an MFD in a single-peak-type refractive index profile (the bending radius is set to be 1.5 mm and the cut-off wavelength is set to be 1,300 nm)

Exemplary embodiments of an optical fiber according to the present invention are explained below. The present invention is not limited to the embodiment.

An optical fiber according to the embodiments of the present invention enables high-speed optical transmission that exhibits a small loss over a 1.3 μm band by single-mode operation at a wavelength of 1,250 nm. A mode field diameter of the optical fiber for a wavelength of 1,300 nm is 6.5 μm or larger and, thereby, a connection loss generated between optical fibers can be reduced and construction of an optical interconnection system is facilitated. Simultaneously, a bending loss for the wavelength of 1,300 nm generated when the optical fiber is bent at a radius of curvature of 1.5 mm is 1 dB/turn and, thereby, flexible wiring and compact accommodation of the optical fiber are enabled. Specific description will be given below.

When a silica-based optical fiber is used for in-apparatus optical wiring, it is required that the optical fiber enables flexible wiring and that it can be compactly accommodated. On the other hand, when construction of a high-speed optical interconnection system is the object, it is desirable that the transmission loss of the optical fiber is close to zero as much as possible. That is, it is desired that no bending loss occurs to an optical fiber for optical interconnection even when the optical fiber is bent with a very small radius of curvature due to wiring constrains. In actual in-apparatus optical wiring, it is possible that an optical fiber is bent at a radius of curvature of about 1.5 mm at several points. In this case, when local bending is applied due to running of an optical fiber for wiring or when a necessary bending loss acceptable value is considered from the viewpoint of the worst case designing, if bending loss is 1 dB or less when one turn of bending at a radius of curvature of 1.5 mm is applied, it can be said that the optical fiber has a sufficiently excellent bending loss characteristic and enables flexible optical wiring ("Turn" is used as the unit to count portions that each form bending (bent portion herein) and, when an optical fiber is bent by 360 degrees, this is counted as "one turn". For example, this term is used as in "four 90-degree bent portions make one turn" and "two 90-degree bent portions make ½ turn").

Usually, for an SMF, it is necessary to increase the effective refractive index in the fundamental mode to reduce the bending loss thereof. When the effective refractive index in the fundamental mode is increased, a method of increasing the relative refractive index difference Δ between the core and a cladding in the refractive index profile of an optical fiber is generally employed. The relative refractive index difference Δ is defined by the following Equation (1). "$n_{core}$" and "$n_{clad}$" respectively are the core region refractive index and the cladding region refractive index.

$$\Delta = \{(n_{core} - n_{clad})/n_{core}\} \times 100 [\%] \quad (1)$$

FIG. 1 shows the result obtained by simulation of the relation between the mode field diameter (hereinafter, "MFD") [μm] at a wavelength of 1,300 nm and the bending loss [dB/turn] per turn at a radius of curvature of 1.5 mm at the wavelength of 1,300 nm, obtained when the relative refractive index difference Δ of the core, the core diameter, and an α value, which is a parameter representing the refractive index profile shape of the core, are gradually varied for an optical fiber that has a single-peak refractive index profile. The cut-off wavelength is fixed at 1,300 nm. α, i.e., the α value that represents the refractive index profile shape of the core, is defined as in Equation (2):

$$n^2(r) = n_{core}^2 \times \{1 - 2\times(\Delta/100)\times(2r/a)^\alpha\} \text{ (where } 0<r<a/2) \quad (2)$$

In Equation (2), "r" denotes the position in the radial direction from the center of the optical fiber; "n(r)" denotes the refractive index at a position r; and "a" denotes the diameter of the core. The symbol "^" is a symbol that denotes the power. For an optical fiber having a single-peak refractive index profile, though the MFD generally becomes smaller when the relative refractive index difference Δ is increased, it can be seen from FIG. 1 that the bending loss can be reduced when the MFD is made small by increasing the relative refractive index difference Δ. It also can be seen that the relation between the bending loss and the MFD does not change even when the α value is changed. That is, in the single-peak refractive index profile, the relation between the bending loss and the MFD is constant and does not depend on the refractive index profile shape of a first core. Similarly, from FIG. 1, it can be seen that MFD of about 6.2 μm or less is necessary to realize a bending loss of 1.0 dB/turn or less. However, the relative refractive index difference Δ of 0.9% or larger is necessary to realize this MFD.

The MFD becomes smaller when the bending loss becomes smaller. For example, for a single-peak refractive index profile with Δ=0.9% and α=2.0, the bending loss is 0.8 dB/turn. However, the MFD is reduced to about 1 μm.

In this case, when an in-apparatus communication system using optical interconnection is constructed, it is assumed that a connection between optical components such as an optical fiber, a VCSEL, etc., is made by a spatial connection. When optical wave guides are connected using a spatial connection, a connection loss usually occurs. This connection loss T is determined by a connection efficiency η and can be theoretically calculated using Equations (3) to (5):

$$T = -10 \times \log \eta \quad (3)$$

$$\eta = \kappa \times \exp\{-\kappa \times [(1/w_1^2 + 1/w_2^2) \times x_0^2/2]\} \quad (4)$$

$$\kappa = 4/\{(w_1/w_2 + w_2/w_1)^2 + ((\lambda \times z/(\Pi \times w_1 \times w_2))^2\} \quad (5)$$

"$w_1$" and "$w_2$" respectively represent MFDs of optical fibers to be connected. "$x_0$" represents the optical axial misalignment between fibers being connected (hereinafter, "axial misalignment"). "λ" represents the wavelength used. "z" represents the distance between the optical fiber facets. In Equations (3) to (4), it is assumed that the optical axes of the fibers are parallel.

Figure 2:
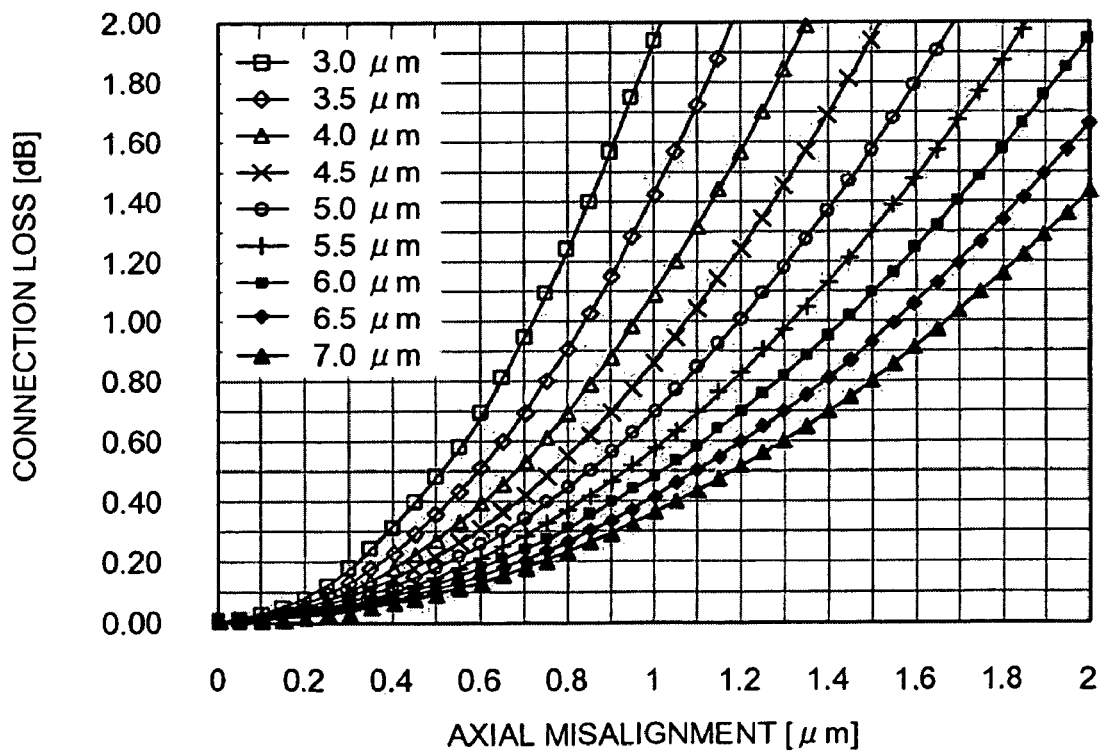
FIG. 2 is a graph of the relation between an axial misalignment and a connection loss when connecting two optical fibers of the same type in each MFD.

FIG. 2 shows the relation between the axial misalignment and the connection loss at a wavelength of 1,300 nm for a spatial connection between optical fibers of the same type obtained using Equations (3) to (5). FIG. 2 is a graph of the relation between an axial misalignment and a connection loss for connection between optical fibers of the same type at MFDs of 3.0 μm to 7.0 μm shown in the legend. The axis of abscissa represents the axial misalignment [μm] for a connection between optical fibers of the same type. The axis of ordinate represents a connection loss [dB] for a connection between optical fibers of the same type.

The relation shown in FIG. 2 is calculated assuming that the distance "z", which is a distance between the connected optical fiber facets, is zero. From FIG. 2, it can be seen that the connection loss increases as the axial misalignment increases. It can also be seen that a trend of the connection loss toward increase thereof becomes strong for an axial misalignment as the MFD of a connected optical fiber becomes small. The axial misalignment and the MFD are important parameters for a connection between an optical fiber and a light source such as a VCSEL, etc., between an optical fiber and a light-receiving unit such as a PD, etc., or between optical fibers. Currently, the maximal value of an axis alignment gap due to errors occurring during manufacture can be about 1.5 μm in some case. Therefore, the loss designing considering that an axis alignment gap of 1.5 μm can be admitted from the viewpoint of the worst case designing is necessary.

For example, construction of high-speed optical interconnection system that includes an optical fiber connecting a VCSEL and a PD is assumed. It is also assumed that an optical output power of the VCSEL is about −10 dBm considering a trend of lowering of the output during high-temperature operation thereof, and the minimal light-receiving sensitivity of the PD is −16 dBm. In this case, only about 6 dB can be secured as the light link loss budget. A detailed optical wiring form for this case will be considered. It is assumed that the above system includes one connection between the optical fiber and the VCSEL, five connections between optical fibers, and one connection between the optical fiber and the PD, and an axis alignment gap of 1.5 μm is present at each connection from the viewpoint of the worst case designing. When it is assumed that, of the connections, an MFD of 5 μm to 7 μm and an axial misalignment of 3° for both components are present for the connections between the VCSEL and the optical fiber and between the optical fiber and the PD, a connection loss of a total of about 1.5 dB occurs.

Therefore, it is necessary to set a permissive total connection loss between the optical fibers to be 4.5 dB or less, that is, to set a connection loss for one connection to be 0.9 dB or less. To satisfy this condition, as shown in FIG. 2, the MFD needs to be at least 6.5 μm. For the above bending-loss-reduced single-peak refractive index profile with Δ=0.9% and α=2.0, a connection loss up to 1.1 dB occurs for one connection because the MFD is about 6.1 μm. Therefore, in this case, the total connection loss is about 5.5 dB and this means that the construction of the high-speed optical interconnection system is difficult.

As above, when the relative refractive index difference Δ is increased to reduce the bending loss in designing the optical fiber refractive index profile, the MFD is decreased and the connection loss is increased. That is, a trading-off relation is present between the bending loss and the connection loss. As shown in FIG. 1, in the single-peak refractive index profile, the above trading-off relation is not improved at all even when the refractive index profile shape of the first core is varied.

The optical fiber of the embodiment improves the trading-off relation between the bending loss and the connection loss by setting the refractive index profile of the core thereof to be a W-shaped refractive index profile based on a two-layer structure, or a W-segment refractive index profile or a quasi-W-shaped refractive index profile based on a three-layer structure, and optimizing these structural parameters.

That is, for SMFs each having a single-peak profile, when the cut-off wavelength is determined by varying the core diameter, optical fibers each having the substantially same MFD show the substantially same bending loss almost not depending on the core shape. However, in profiles such as a W-shaped profile based on an optical fiber having a depressed layer that has a lower refractive index than that of a cladding as a second core on the outer circumference of a first core, the MFD can be varied maintaining a bending loss and a cut-off wavelength that are same as those of a single-peak profile. This is because providing the depressed layer causes the cut-off wavelength not to shift toward a longer wavelength even when the relative refractive index difference (Δ) of the center core is increased and, therefore, the core diameter does not need to be reduced to adjust the cut-off wavelength. When a depressed layer is provided as a second core, the shape of the first core significantly influences the MFD. The light-confining effect becomes weak and the MFD becomes large as the α value that represents the refractive index profile shape of the first core becomes small. On the other hand, the MFD is not sensitively influenced by the magnitude of the relative refractive index difference Δ and the layer width of the depressed layer.

On the other hand, when a form of in-apparatus optical wiring is assumed, the wiring is demanded to be compactly accommodated and it can be considered that small bending at a small radius of curvature of the bending radius of about 5 mm due to deformation, etc., for wiring is applied at various points in the apparatus in addition to the above bending having the bending radius of about 1.5 mm. For each of the points at which bending at a radius of curvature of about 1.5 mm is applied, heat treatment, etc., are applied and measures to release the strain are taken. However, no such measures are taken for the bending at a bending radius of about 5 mm that occurs at the various points in the apparatus. Therefore, when bending at a small radius of curvature is applied at a point at which bending at a bending radius of about 5 mm has been applied to the optical fiber, it is worried that the optical fiber is broken by the stress strain that occurs at the bent portion. Therefore, the probability of break due to the bending needs to be reduced.

A bending loss differs depending on the bending radius. When the bending radius is extended from 1.5 mm to 5 mm, the bending loss thereof is reduced by about two digits and, therefore, even an optical fiber having 10 dB/turn for the bending radius of 1.5 mm is improved to have 0.1 dB/turn for the bending radius of 5 mm. Therefore, when the optical fiber satisfies a condition of 1 dB/turn for a bending radius of 1 mm, the variation of the loss is within an error even when bending at a radius of 5 mm is applied to the optical fiber for wiring thereof.

Generally, the strain that is caused when an optical fiber is bent becomes large and the probability of break becomes high as the cladding diameter becomes large. For example, it is assumed that bending corresponding to one turn of the bending radius r=about 5 mm is present in an optical fiber when an optical interconnection system using the optical fiber is constructed. The relation between the cladding diameter and the probability of the fiber break of the optical fiber in this case, obtained by simulation is shown in FIG. 3.

Figure 3:
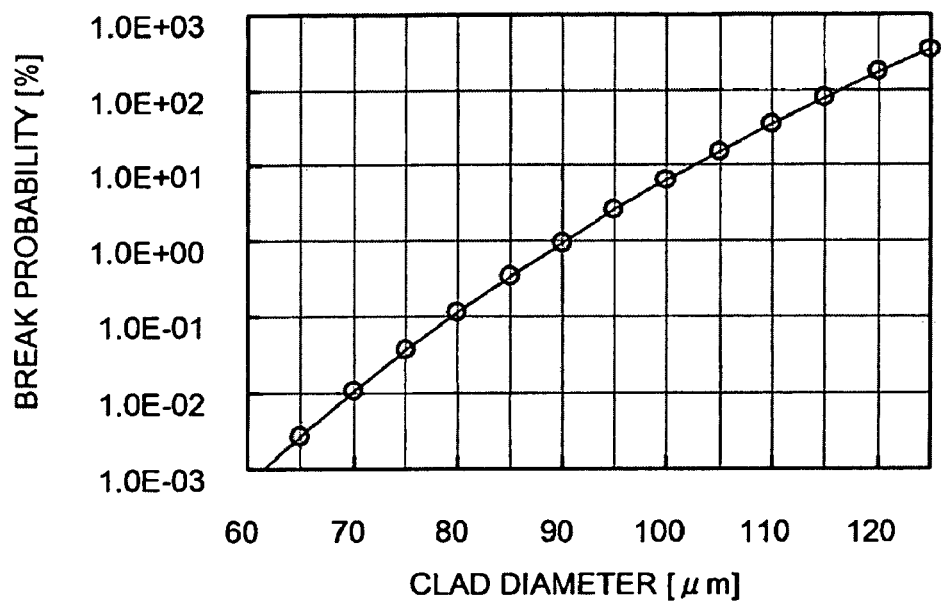
FIG. 3 is a graph of the relation between the break probability and the cladding diameter obtained when it is assumed that the bending radius is 5 mm, that the number of turns is one, and that the life is five years.

FIG. 3 is a graph of the relation between the break probability and the cladding diameter for an optical fiber assuming the bending radius of 5 mm, one turn, and life of five years. The axis of ordinate thereof represents the break probability [%] and the axis of abscissa thereof represents the cladding diameter [μm]. In this simulation, the screening level of 1.5%, the fatigue factor with the coating material of 18, and the life of the product of five years are assumed. When the cladding diameter of the optical fiber is 125 μm, the break probability of the optical fiber reaches 100% within five years and the construction of the system is impossible. However, the fiber break probability is 0.9% when the cladding diameter is reduced to 90 μm and, therefore, the probability can be reduced to about 0.3% of that for 125 μm. It is preferable that the break probability is 1.0% or less for the system designing. For an ordinary optical fiber, the demand for improving the probability of break thereof due to bending is not so strong from the viewpoint of the occurrence of the bending loss thereof. However, when the optical fiber is bent at a small radius as in optical interconnection, an effect obtained by reducing the probability of break due to the above small-radius winding is significant.

On the other hand, for an SMF, it is said that a cladding region up to about ten times as long as the MFD influences the transmission loss thereof. Therefore, for a fiber for the present use that has an MFD of 6.5 μm or larger, no increase of the transmission loss caused by reducing the cladding diameter occurs when the cladding diameter is 65 μm or larger.

That is, for the optical fiber of the embodiment, the cladding diameter thereof is reduced from 65 μm to 90 μm and, thereby, the break probability for the case where bending stress is decreased and the flexibility of wiring is improved.

Figure 4:
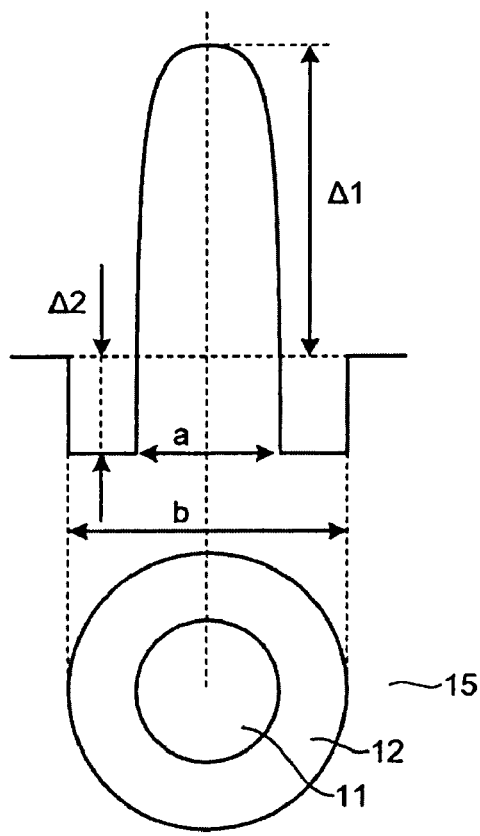
FIG. 4 is a diagram of a W-shaped refractive index profile that is used for simulation.

More detailed description will be given below for the optical fiber of the embodiment referring to the simulation result. Characteristics are obtained using simulation, of optical fibers having the cladding diameter of 80 μm, formed of silica-based glass, and having a W-shaped refractive index profile as shown in FIG. 4. In each of the optical fibers having the W-shaped refractive index profile shown in FIG. 4 a first core 11 (diameter "a") that is located at the central portion and that is doped with germanium is provided; a second core 12 (diameter "b") that surrounds the first core 11 and that is doped with fluorine is provided; and a cladding 15 that surrounds the second core 12 and that is formed of pure quarts is provided. For optical fibers each having the W-shaped refractive index profile shown in FIG. 4, the simulation result of the characteristics of the optical fibers denoted by A1 to A7 for which parameter values are respectively varied is shown in FIG. 5. The above pure silica means quarts that contains no dopants for refractive index adjustment, and may contain Cl element, etc., that do not influence the refractive index of the fiber.

Relative refractive index differences Δ1 and Δ2 are respectively the relative refractive index of the first core 11 against the cladding 15 and the relative refractive index of the second core 12 against the cladding 15, are respectively expressed as shown in Equations (6) and (7):

$$\Delta 1 = \{(n_{c1} - n_c)/n_c\} \times 100 [\%] \quad (6)$$

$$\Delta 2 = \{(n_{c2} - n_c)/n_c\} \times 100 [\%] \quad (7)$$

In Equations (6) and (7), $n_{c1}$ is the maximum refractive index of the first core 11; $n_{c2}$ is the minimum refractive index of the second core 12; and $n_c$ is the refractive index of the cladding 15. The α value of the first core 11 is assumed to be α1.

In the W-shaped refractive index profile, the diameter a of the first core 11 is defined as a diameter measured at a position at which the same refractive index as that of the cladding 15 is present on the boundary between the first core 11 and the second core 12, and the diameter b of the second core 12 is defined as a diameter measured at a position at which a relative refractive index difference that is ½ of the relative refractive index difference Δ2 that is described later is present on the boundary between the second core 12 and the cladding 15.

For each of the optical fibers denoted by A1 and A7, the α value of the first core 11 is sufficiently large and the shape of the first core 11 can be regarded as being step type and, therefore, α1 is described as "step" in FIG. 5. Of the optical fibers denoted by A1 to A7 of FIG. 5, those that each have an MFD of 6.5 μm or larger at a wavelength of 1,300 nm, that each transmit light with a wavelength of 1250 nm in a single mode, and that each have a bending loss of 1 dB/turn or less when bent at a radius of 1.5 mm, are those denoted by A1 to A4. Therefore, from these simulation results, for the optical fibers each having the W-shaped profile as shown in FIG. 4, it is known that an optical fiber of an embodiment of the present invention that has the desired characteristics can be obtained by setting the relative refractive index difference (Δ1) to be 0.6% or larger and 0.8% or smaller and the a value to be 1.5 or larger for the first core 11; and the relative refractive index difference (Δ2) to be −0.05% or smaller for the second core 12. Especially, the relative refractive index difference (Δ2) of the second core 12 may preferably be set to be −0.05% or smaller. That is, the refractive index of the second core 12 may slightly be decreased against the refractive index of the cladding 15 and, therefore, the degrees of freedom in designing the refractive index profile becomes high and the manufacturability also becomes high.

"Cut-off frequency" here means the fiber cut-off frequency λc provided in ITU-T G.650.1. Other terms that are not defined herein follow the definitions and measuring methods in ITU-T G.650.1.

Figure 6:
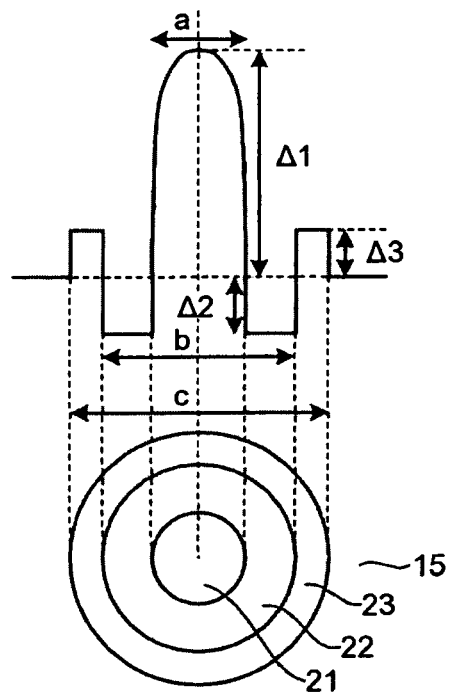
FIG. 6 is a diagram of a W-segment-type refractive index profile that is used for simulation.

Characteristics are obtained using simulation, of optical fibers having the cladding diameter of 80 μm, formed of silica-based glass, and having a W-segment profile as shown in FIG. 6. In each of the optical fibers having the W-segment profile shown in FIG. 6 a first core 21 (diameter "a") that is located at the central portion and that is doped with germanium is provided; a second core 22 (diameter "b") that surrounds the first core 21 and that is doped with fluorine is provided; a third core 23 (diameter "c") that surrounds the second core 22 and that is doped with germanium is further provided; and the cladding 15 that surrounds the third core 23 and that is formed of pure quarts is provided. A relative refractive index difference Δ3 is the relative refractive index difference of the third core 23 against the cladding 15 and is expressed as shown in Equation (8):

$$\Delta 3 = \{(n_{c3} - n_c)/n_c\} \times 100 [\%] \tag{8}$$

In Equation (8), $n_{c3}$ is the maximum refractive index of the third core 23 in the W-segment profile. In the W-segment refractive index profile, the diameter a of the first core 21 is defined as a diameter measured at a position at which the same refractive index as that of the cladding 15 is present on the boundary between the first core 21 and the second core 22. The diameter b of the second core 22 is defined as a diameter measured at a position at which a relative refractive index difference that is ½ of the relative refractive index difference Δ2 is present on the boundary between the second core 12 and the cladding 15. The diameter c of the third core 23 is defined as a diameter measured at a position at which a relative refractive index difference that is ⅒ of the relative refractive index difference Δ3 is present on the boundary between the third core 23 and the cladding 15.

The simulation result of the characteristics of the optical fibers obtained when each of the parameter values is properly set for optical fibers having the W-segment profile shown in FIG. 6 is shown being denoted by B of FIG. 5. As a result, it is known that optical fibers having desired characteristics can be obtained depending on the setting of each parameter similarly for the case of the optical fibers each having the W-segment profile.

Figure 7:
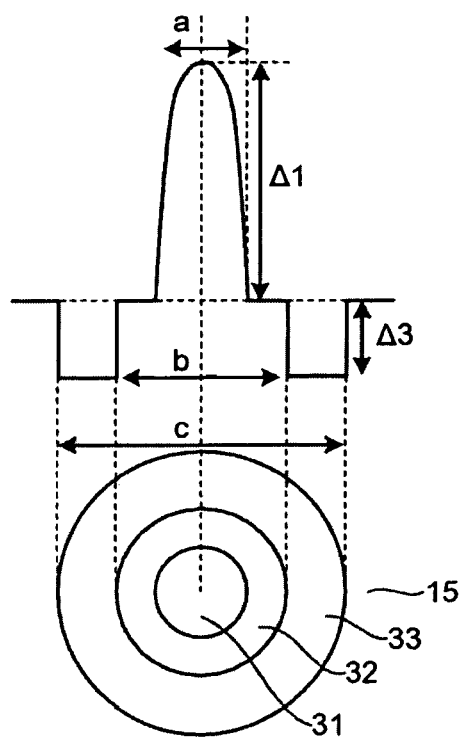
FIG. 7 is a diagram of a quasi-W-shaped refractive index profile that is used for simulation.

Characteristics are obtained using simulation, of optical fibers having the cladding diameter of 80 μm, formed of silica-based glass, and having a quasi-W-shaped profile as shown in FIG. 7. In each of the optical fibers having the quasi-W-shaped profile shown in FIG. 7 a first core 31 (diameter "a") that is located at the central portion and that is doped with germanium is provided; a second core 32 (diameter "b") that surrounds the first core 31 and that is formed of pure silica glass is provided; a third core 33 (diameter "c") that surrounds the second core 32 and that is doped with germanium is further provided; and the cladding 15 that surrounds the third core 33 is provided. A relative refractive index difference Δ3 is the relative refractive index difference of the third core 33 against the cladding 15 and is expressed as shown in Equation (9):

$$\Delta 3 = \{(n_{c3} - n_c)/n_c\} \times 100 [\%] \tag{9}$$

In Equation (9), $n_{c3}$ is the minimum refractive index of the third core 33 in the quasi-W-shaped profile. In the quasi-W-shaped refractive index profile, the diameter a of the first core 31 is defined as a diameter measured at a position at which a refractive index difference that is ⅒ of the relative refractive index difference Δ1 is present on the boundary between the first core 31 and the second core 32. The diameter b of the second core 32 is defined as a diameter measured at a position at which a relative refractive index difference that is ½ of the relative refractive index difference Δ3 is present on the boundary between the second core 32 and the third core 33. The diameter c of the third core 33 is defined as a diameter measured at a position at which a relative refractive index difference that is ½ of the relative refractive index difference Δ3 is present on the boundary between the third core 33 and the cladding 15.

The simulation result of the characteristics of the optical fibers obtained when each of the parameter values is properly set for optical fibers having the quasi-W-shaped refractive index profile shown in FIG. 7 is shown being denoted by C of FIG. 5. As a result, it is known that optical fibers having desired characteristics can be obtained depending on the setting of each parameter similarly for the case of the optical fibers each having the quasi-W-shaped profile.

Description will be given about an optical interconnection system according to the embodiment of the present invention. When optical fibers are used for optical interconnection, it is assumed that the optical fibers are made in the form of a ribbon and, thereby, an optical transmission body is caused to have multiple channels and high-speed optical communication is executed. Usually, according to the specification of a silica-based optical fiber, it is general that an outer diameter after coating is 250 μm against a cladding diameter of 125 μm and the pitch of an optical fiber ribbon formed by mutually joining a plurality of optical fibers placed in parallel to each other is 250 μm. For a small-diameter optical fiber for which the outer diameter of the optical fiber is reduced, the outer diameter after coating is also a small diameter and, therefore, manufacture of an optical fiber ribbon having a narrower pitch than that of a conventional optical fiber ribbon is enabled. Therefore, it is preferable to use the above small-diameter optical fiber having a cladding diameter of 65 μm to 90 μm. An optical fiber ribbon having a narrow pitch using the small-diameter optical fibers is highly flexible for wiring and can be accommodated saving space and, therefore, is an optical component that is suitable for optical interconnection.

As seen from the above simulation result, the optical fiber of the embodiment enables the single-mode propagation in the 1.3 μm band and has the excellent bending loss property and the excellent connection loss property in the 1.3 μm band. An exemplary configuration of an optical interconnection system 50 that applies the optical fiber of the embodiment as a transmission medium and that uses a VCSEL having an oscillation frequency of the 1.3 μm band as a light source is shown in FIG. 8.

Figure 8:
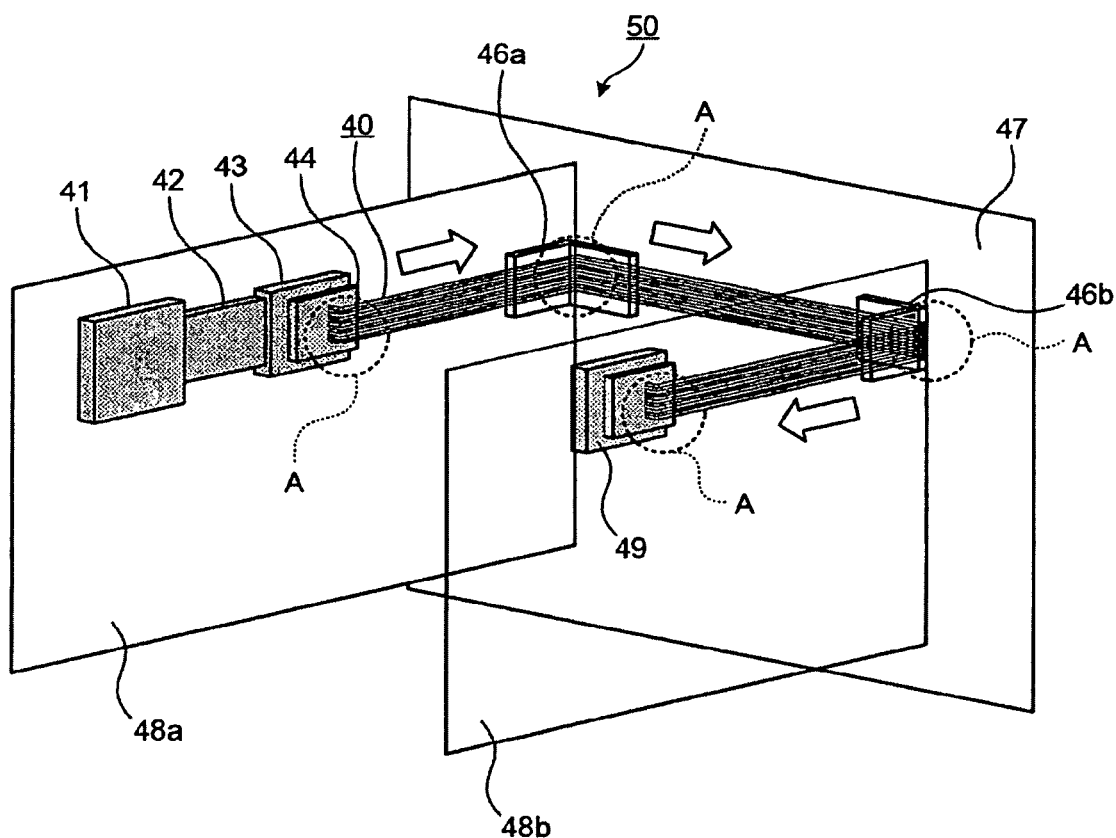
FIG. 8 is a perspective view of an exemplary construction of an optical interconnection system for a communication wavelength band of 1.3 μm according to an embodiment of the present invention.

In FIG. 8, two printed circuit boards 48a and 48b are erected of which each one side is supported, on one face of a back plane 47. The two printed circuit boards 48a and 48b are facing each other sandwiching a predetermined spacing. On the face of the printed circuit board 48a that faces the other board, a VCSEL 44 and an LSI 41 implemented on a driver IC 43 are provided. The LSI 41 and the VCSEL 44 are electrically connected by an electric wiring 42. On the face of the other printed circuit board 48b that faces the other board, a PD 49 is provided. The VCSEL 44 and the PD 49 are optically connected by an optical fiber ribbon 40 formed by integrating a plurality of optical fibers each according to the embodiment in the form of a flat belt. The optical fiber ribbon 40 first extends along the main face of the one printed circuit board 48a; is bent at a substantial right angle by a first connector 46a; after running on the back plane 47, is bent at a substantial right angle through a second connector 46b; extends along the main face of the other printed circuit board 48b; and reaches the PD 49.

Figure 9:
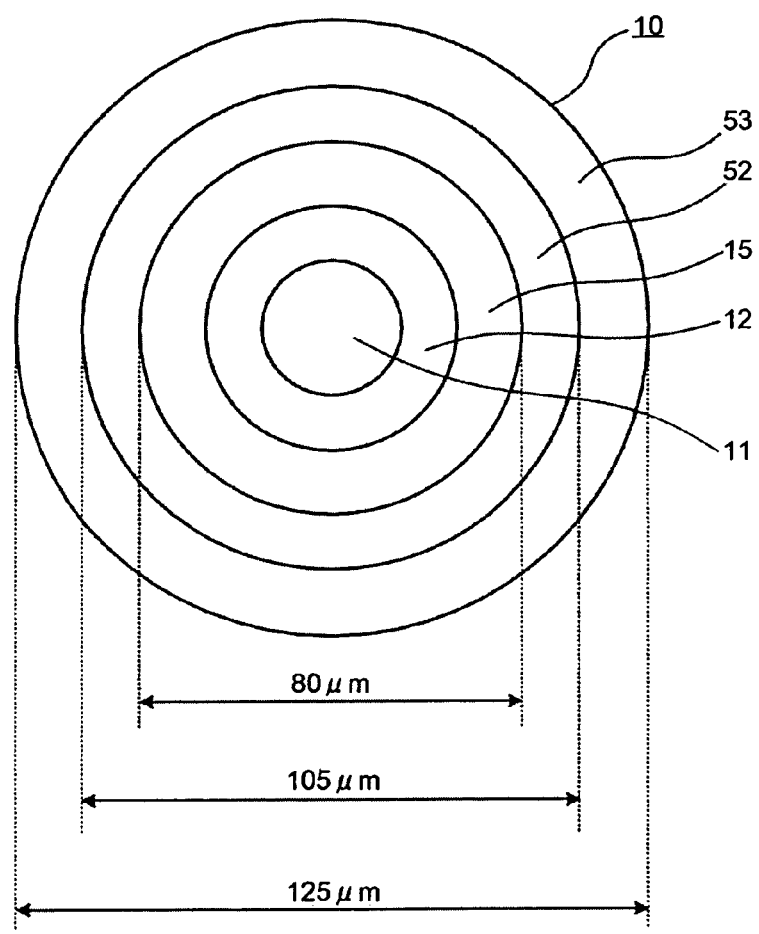
FIG. 9 is a lateral cross-sectional view of a small-diameter optical fiber used in the exemplary construction of the optical interconnection system of FIG. 8.
Figure 10:
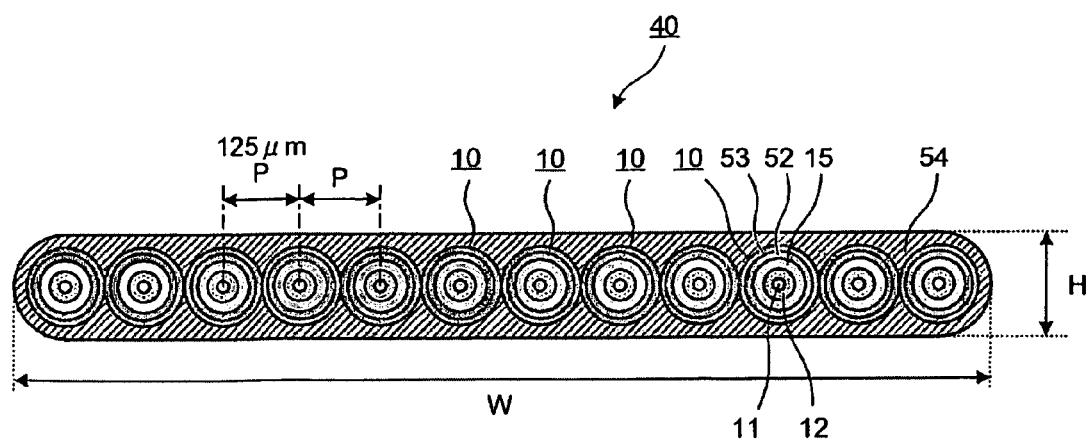
FIG. 10 is a lateral cross-sectional view of a 12-conductor small-diameter optical fiber ribbon used in the exemplary construction of the optical interconnection system of FIG. 8.

Due to such routing of the optical fiber, the optical fiber ribbon 40 is applied with four bent portions A at the radius of curvature of 1.5 mm respectively at four positions respectively by ¼ turn. Though about one turn of bending at a bending radius of about 5 mm is present due to deflection, etc., not shown, of the optical fiber, the system is operable without any problem. As shown in FIG. 9, an optical fiber 10 is used that has the W-shaped refractive index profile shown in FIG. 4, that has the diameter of the cladding 15 thereof of 80 μm, that has the outer diameter of a primary coating resin 52 thereof of 105 μm, that has the outer diameter of a secondary coating resin 53 thereof of 125 μm, and that has parameter values denoted by A3 of FIG. 5 being set therein, as the optical fiber 10 used in the optical fiber ribbon 40. As shown in FIG. 10, the optical fiber ribbon 40 is formed by placing 12 optical fibers 10 in parallel to each other at pitches P of 125 μm, and joining these optical fibers 10 by coating the fibers 10 with a ribbon coating resin 54.

In the optical fiber ribbon 40, the coating diameter H (thickness H) is 170 μm taking into consideration both elements that are an added loss amount generated by making the coating resins 52 and 53 thinner and space-saving. The optical fiber ribbon 40 for which the pitch P is set to be 125 μm has a half of the conventional size, has high flexibility, and can be accommodated saving space in an apparatus. A UV-curable resin is used as the material of the coating resins 52 and 53.

When small-diameter optical fibers that each have the diameter of the cladding 15 of 65 μm, and that has the difference between the coating outer diameter and the cladding outer diameter of 20 μm are used as the optical fibers 10, the pitch P may be reduced to 85 μm.

The finished dimensions of the optical fiber ribbon 40 are 1.55 mm for a width W and 0.17 mm for a thickness H. By arranging a light source VCSEL that is the connection counterpart in an array having a pitch of 125 μm and 12 channels, collective optical connection by the manufactured optical fiber ribbon 40 is enabled. In this structure, by directly modulating a VCSEL, ultra-high-speed optical communication exceeding 100 Gbps is realized.

Because the cladding diameter is set to be 80 μm, the break probability due to bending can be reduced and, therefore, substantially no break occurs after five years have passed that is the product life.

A flame-resisting ribbon core fiber was manufactured using a flame-resisting UV-curable urethane acrylate resin as the UV-curable resin that is the material of the coating resins 52 and 53 in the optical fiber ribbon 40. Giving a flame-resisting property was considered by adding to the resin a halogen-based additive such as bromine and chlorine; an antimonial compound such as antimonous oxide and triphenyl antimony; a metal hydrate such as aluminum hydroxide and magnesium hydroxide; and a phosphoric compound such as phosphate, or by halogenating with bromine or chlorine the pre-polymer or acryl-monomer itself that configures the UV-curable resin and infiltrating phosphorus therein, during the manufacture of the flame-resisting uv-curable urethane acrylate resin used in this case. Of these methods, the method of adding a bromine-based flame-resisting agent was especially effective.

It is considered that the reason why the giving of the flame-resisting property was realized by varying the composition as above is that a product generated by a decomposition reaction coats the resin surface or that a cracked gas generated during combustion forms an insulating layer between the resin and air. It also is considered that radicals from a halogen-containing compound prevent combustion from continuing or that the resin is made three-dimensional by bridging.

An optical fiber ribbon obtained using a UV-curable urethane acrylate resin that contains aluminum hydroxide as a flame-resisting agent was evaluated in a 60-degree inclined combustion test according to the JIS C3005 standard as a ribbon coating resin. As a result, flames ignited on the fibers were automatically put out in about 3.2 seconds on average and the resin could meet the standard. Though the flame-resisting UV-curable resin was used in this case, a flame-resisting thermo-plastic resin or a flame-resisting heat-curable resin may also be used instead of the flame-resisting UV-curable resin.

It was considered to obtain a high flame-resisting property by replacing the whole or a part of each of the coating resins 52 and 53 of the optical fiber ribbon 40, and the ribbon coating resin 54 with a flame-resisting UV-curable resin. As a result, with an optical fiber ribbon obtained using a UV-curable urethane acrylate resin containing a flame-resisting agent at least for the secondary coating resin 53 of the optical fiber and the ribbon resin, in a 60-degree inclined combustion test according to JIS C3005 standard, flames ignited were automatically put out in about 2.6 seconds on average and this resin could meet the standard.

A vertical combustion test according to UL1581 standard was executed to the above optical fiber ribbon and, as a result, flames were automatically put out in 5.7 seconds in average. No burning drips were observed, which means that this ribbon could meet the UL standard. Similar vertical combustion test was executed to an optical fiber that was at a stage of an element wire thereof having been applied with the processes up to the secondary coating and, as a result, flames were automatically put out in 7.6 second on average and the optical fiber had a sufficient flame-resisting property in the forms of an element wire thereof and a ribbon core fiber. Though the flame-resisting UV-curable resin was used in this case, a flame-resisting thermo-plastic resin or a flame-resisting heat-curable resin may also be used instead of the flame-resisting UV-curable resin.

The embodiments enable realization of reduction of both of the bending loss and the connection loss, obtaining of an optical fiber and an optical fiber ribbon that enable high-speed optical transmission, and, thereby, easy construction of an optical interconnection system.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical fiber, made of silica-based glass, comprising:
a core; and
a cladding, wherein
the optical fiber has a mode field diameter of 6.5 μm or larger at a wavelength of 1300 nm, is configured to transmit light with a wavelength of 1250 nm in a single mode, and has a bending loss of 1 dB/turn or smaller at a wavelength of 1300 nm when the optical fiber is bent with a curvature radius of 1.5 mm.

2. The optical fiber according to claim 1, wherein a diameter of the cladding is 65 μm to 90 μm.

3. The optical fiber according to claim 2, wherein
a relative refractive index difference of a first core, which is located at a central portion, with respect to the cladding is between 0.6% and 0.8%, inclusive,
an α value of the first core is 1.5 or larger, and
a relative refractive index difference of a second core, which surrounds the first core, with respect to the cladding is −0.05% or smaller.

4. The optical fiber according to claim 2, further comprising a coating formed of at least any one of a UV-curable resin, a thermo-plastic resin, and a heat-curable resin, and wherein the coating has a flame-resisting property.

5. The optical fiber according to claim 3, further comprising a coating formed of at least any one of a UV-curable resin, a thermo-plastic resin, and a heat-curable resin, and wherein the coating has a flame-resisting property.

6. The optical fiber according to claim 1, wherein
a relative refractive index difference of a first core, which is located at a central portion with respect to the cladding is between 0.6% and 0.8% inclusive,
an α value of the first core is 1.5 or larger, and
a relative refractive index difference of a second core, which surrounds the first core, with respect to the cladding is −0.05% or smaller.

7. The optical fiber according to claim 6, further comprising a coating formed of at least any one of a UV-curable resin, a thermo-plastic resin, and a heat-curable resin, and wherein the coating has a flame-resisting property.

8. The optical fiber according to claim 1, further comprising a coating formed of at least any one of a UV-curable resin, a thermo-plastic resin, and a heat-curable resin, and wherein the coating has a flame-resisting property.

9. An optical fiber ribbon, wherein
the optical fiber ribbon is formed by placing a plurality of optical fibers in parallel to each other and integrating the optical fibers in a form of a flat belt,
each of the optical fibers, made of silica-based glass, comprising:
a core; and a cladding, wherein
each of the optical fibers has a mode field diameter of 6.5 μm or larger at a wavelength of 1300 nm, is configured to transmit light with a wavelength of 1250 nm in a single mode, and has a bending loss of 1 dB/turn or smaller at a wavelength of 1300 nm when the optical fiber is bent with a curvature radius of 1.5 mm.

10. The optical fiber ribbon according to claim 9, wherein the optical fibers integrated in the form of a flat belt have a ribbon coating formed of at least any one of a flame-resisting UV-curable resin, a flame-resisting thermo-plastic resin, and a flame-resisting heat-curable resin.

11. An optical interconnection system for a communication wavelength of a 1.3 μm band, the optical interconnection system comprising:
an optical fiber, made of silica-based glass, comprising:
a core; and
a cladding, wherein
the optical fiber has a mode field diameter of 6.5 μm or larger at a wavelength of 1300 nm, is configured to transmit light with a wavelength of 1250 nm in a single mode, and has a bending loss of 1 dB/turn or smaller at a wavelength of 1300 nm when the optical fiber is bent with a curvature radius of 1.5 mm, and the optical fiber is configured to transmit the signal light; and
a Vertical-Cavity Surface-Emitting Laser that injects an optical signal in a wavelength of a 1.3 μm band into the optical fiber.

12. The optical interconnection system according to claim 11, wherein a plurality of the optical fibers are placed in parallel to each other and are integrated into a flat belt.

* * * * *